(12) United States Patent
Korn et al.

(10) Patent No.: US 10,907,574 B2
(45) Date of Patent: Feb. 2, 2021

(54) SCREW CONNECTION SYSTEM FOR A PLASTIC COMPONENT AND A METAL COMPONENT

(71) Applicant: MANN+HUMMEL GmbH, Ludwigsburg (DE)

(72) Inventors: Alexander Korn, Gueglingen (DE); Marco Battezzati, Aidlingen (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 0 days.

(21) Appl. No.: 16/506,401

(22) Filed: Jul. 9, 2019

(65) Prior Publication Data
US 2020/0011270 A1 Jan. 9, 2020

(30) Foreign Application Priority Data
Jul. 9, 2018 (DE) .................. 10 2018 005 400

(51) Int. Cl.
*F02F 7/00* (2006.01)
*F16B 37/12* (2006.01)

(52) U.S. Cl.
CPC .......... *F02F 7/0021* (2013.01); *F16B 37/122* (2013.01); *F02F 2007/0041* (2013.01); *F16B 2200/406* (2018.08)

(58) Field of Classification Search
CPC ............. F02F 7/0021; F02F 2007/0041; F16B 37/122; F16B 2200/40; F16B 2200/403; F16B 2200/406
See application file for complete search history.

(56) References Cited

U.S. PATENT DOCUMENTS

| 2011/0142565 A1* | 6/2011 | Pudvah | F16B 41/002 |
| | | | 411/107 |
| 2017/0211528 A1* | 7/2017 | Nola | F02M 35/10249 |
| 2017/0306884 A1* | 10/2017 | Tomlinson | F16J 15/062 |

FOREIGN PATENT DOCUMENTS

| DE | 10040476 C1 | 8/2001 |
| DE | 102007037461 A1 | 7/2008 |
| DE | 102012203520 A1 | 9/2013 |
| EP | 0313923 B1 | 5/1989 |
| EP | 1774151 B1 | 4/2007 |

* cited by examiner

*Primary Examiner* — Jacob M Amick
(74) *Attorney, Agent, or Firm* — James Hasselbeck

(57) ABSTRACT

A screw connection system connecting a plastic component with a metal component has a bushing and a screw with a screw shank and an external thread arranged on the screw shank. The screw is captively guided in the bushing. The bushing, in a screw-connected state of the screw connection system, extends with a first section in a bore of the plastic component and with a second section in an aligned bore of the metal component aligned with the bore of the plastic component. The bore of the plastic component and the aligned bore of the metal component are positioned at an angle relative to a vertical line on joining surfaces of the plastic component and of the metal component adjoining each other in the screw-connected state. The bushing is movable out of the plastic component when screwing the screw into the metal component.

18 Claims, 5 Drawing Sheets

SCREW CONNECTION SYSTEM FOR A PLASTIC COMPONENT AND A METAL COMPONENT

BACKGROUND OF THE INVENTION

The invention concerns a screw connection system for a plastic component and a metal component, in particular for a suction module and a cylinder head of an internal combustion engine, a use of a screw connection system as well as a plastic component for such a screw connection system.

Slanted screw connections for connecting components are generally known. Slanted screw connections are used, for example, when installation space for the screw connection system is to be saved.

DE 10 2007 037 461 A1 discloses a screw connection system with slanted screw connection for connecting a bearing cover with a cylinder crankcase.

SUMMARY OF THE INVENTION

It is an object of the invention to provide a reliable screw connection system that is suitable in particular for connecting a plastic component with a metal component.

A further object resides in providing a plastic component for such a screw connection system.

A further object resides in providing a use of a screw connection system.

The aforementioned object is solved according to one aspect of the invention by a screw connection system for connecting a plastic component with a metal component, in particular a suction module with a cylinder head of an internal combustion engine. The screw connection system comprises at least one screw comprising an external thread, arranged on a screw shank, and guided captively in a bushing, wherein the bushing extends at least with a section thereof in the bore of the plastic component and at least with a section thereof in a bore of the metal component, which bores extend at an angle unequal to zero angle degrees relative to a vertical line on joining surfaces of the plastic component and of the metal component which, in a screw-connected state, adjoin each other, and wherein the bushing is configured to be moveable out of the plastic component when screwing the screw into the metal component.

Beneficial configurations and advantages of the invention result from the further claims, the description, and the drawing.

A screw connection system for connecting a plastic component with a metal component, in particular a suction module with a cylinder head of an internal combustion engine, is proposed, comprising at least one screw comprising an external thread, arranged on a screw shank, and captively guided in the bushing. The bushing extends at least with a section thereof in a bore of the plastic component and at least with a section thereof in a bore of the metal component, which bores extend at an angle unequal to zero angle degrees relative to a vertical line on joining surfaces of the plastic component and of the metal component which, in a screw-connected state, adjoin each other. The bushing is configured to be moveable out of the plastic component when screwing the screw into the metal component.

The screw connection system according to the invention serves for connecting a plastic component with a metal component, for example, a plastic suction module with the metal cylinder head of an internal combustion engine, and comprises the advantage that the screw connection system is easily releasable in a service situation. Due to the two-part screw connection system with a thin shank screw and a bushing with inner thread as a captive securing means, the suction module can be mounted and demounted without auxiliary tools. According to the invention, a reliable slanted screw connection by means of standard elements is proposed without an additional clamping strip. Further advantages are a reduced number of components as well as a better tolerance behavior than in case of screw connection systems according to the prior art.

The screw connection system provides that in a so-called delivery position of the screw connection system the screw, together with the bushing as a component group, is captively arranged in the plastic component. The bushing does not project past a joining surface of the plastic component. The screw, when not screwed in, can be completely pushed back, practically without force action, into the bushing such that the screw also does not project past the joining surface of the plastic component. The screw advantageously is loosely, but captively, suspended in the bushing.

When mounting the screw connection system, the screw pulls the bushing in position and generates in this way a reliable screw connection of the plastic component with the metal component. During the screw-in process, the bushing is axially moved from the delivery position into its end position. The bushing is supported in a stepped bore in the metal component; the screw head compresses a plastic socket and ensures in this way a reliable screw connection and, optionally, a compression of a seal which may be arranged between the joining surface of the plastic component and a joining surface of the metal component. The bushing is guided radially only within the plastic socket, in the metal component the bushing has a radial play relative to the stepped bore. The radial centering action of the suction pipe can be realized beneficially by additional centering pins.

In a so-called service position of the screw connection system in which the two screw-connected parts are to be separated, the screw is unscrewed from the thread in the metal component and can then be pulled back together with the bushing into the delivery position so that the plastic component can be lifted easily off the metal component.

By the arrangement of the screw at a slant to the joining surfaces of the screw connection partners, a screw connection flange can be designed to be beneficial with regard to installation space. Also, a beneficial force introduction through the slanted screw connection is realized so that a particularly reliable and safe screw connection of the plastic component with the metal component can be realized. An angle of the slanted screw connection to a vertical line on the joining surface can be advantageously less than 45 angle degrees.

As a screw, advantageously a standard screw with a pilot tip can be used which, when screw-connecting the plastic component to the metal component, can be easily guided into the bore of the metal component. The bushing can be embodied as a steel bushing. The plastic component can be formed of conventional plastic material, for example, polyamide, optionally with glass fiber reinforcement, for example, polyamide with 35% glass fiber proportion (PA 35) or the like.

By means of the screw connection system according to the invention, a plastic component can be connected with a metal component such that a fluid connection between the two components is provided, for example, an air supply of a cylinder head of an internal combustion engine from a suction module.

According to a beneficial embodiment, the bushing, in the not yet screw-connected state, can be immersed in the plastic component relative to the joining surface of the plastic component. In this way, the plastic component can be brought in a beneficial way into a desired mounting position on the metal component, without projecting bushings and/or screws of the plastic component having to be precisely positioned on the metal component.

According to a beneficial embodiment, in the not yet screw-connected state, a segment of the at least one screw projecting at the joining surface from the bushing can be arranged loosely in the bushing such that the screw can be pushed substantially without force in axial direction into the plastic component. Since the screw, due to its external thread that has a greater diameter than the screw shank between the screw head and the external thread, is secured in the bushing and cannot fall out, the screw shank can be freely moved in an inner thread of the bushing. Accordingly, the screw is freely movable within the bushing and can therefore completely be immersed into the bushing without problems.

According to a beneficial embodiment, a centering device can be provided in order to position the plastic component on the metal component, in particular, a centering element can be provided that engages a centering receptacle. By means of the centering device, the plastic component can be positioned on the metal component such that the bushing with the screw arranged thereat can be inserted into the corresponding bore in the metal component. In this way, the screw connection of the plastic component with the metal component can be preformed in a reliable manner. The centering element can advantageously absorb radial forces of the screwing action.

According to a beneficial embodiment, the bushing can comprise at least in a section thereof an inner thread, in particular, the inner thread can be provided at the side of the bushing that is facing away from the joining surface of the plastic component. The external thread of the screw can be screwed into the inner thread so that the bushing is connected with the screw and can be moved by the screw in the bore of the plastic component and the metal component. The screw can be removed from the bushing by unscrewing from the inner thread of the bushing. When the screw with its external thread is screwed into the inner thread of the bushing, the bushing can be moved in the bore of the plastic component such that screw and bushing do not project past the joining surface of the plastic component.

According to a beneficial embodiment, for release of the screw connection between plastic component and metal component, the bushing can be configured to be pulled out of the bore of the metal component, in particular, the bushing can be pulled out by means of the screw which is screwed into the inner thread of the bushing. The inner thread can be designed in particular such that it can interact beneficially with the external thread of the screw and the bushing thus can be pulled out of the bore of the metal component via the inner thread by means of the screw screwed into it and thus can be pulled out again out of the mounted position. In this way, the screw connection can be released in a simple way and the two parts, plastic component and metal component, can be removed from each other.

According to a beneficial embodiment, the bore in the metal component can be embodied as a stepped bore. A step of the stepped bore in the metal component can serve as a stop for the bushing in axial direction, i.e., in the direction of the longitudinal axis of the screw, bushing, and bores. In this way, by contact of the screw head on a socket of the bushing, the screw can be tightened fast and, in this way, the plastic component can be screw-connected securely on the metal component.

According to a beneficial embodiment, the bushing in the screw-connected state of the at least one screw can be clamped between a step of the bore which is embodied as a stepped bore in the metal component and the screw head at the bore of the plastic component. A step of the stepped bore in the metal component can serve as a stop for the bushing in axial direction. In this way, by contact of the screw head on a socket of the bushing, the screw can be tightened fast and, in this way, the plastic component can be screw-connected securely with the metal component.

According to a beneficial embodiment, at least two bores, oppositely arranged relative to each other, in the plastic component and in the metal component can be provided wherein at least one of the bores can be provided so as to extend toward the other one. Two bores that are positioned opposite each other are beneficial for a symmetric force introduction into the plastic component and the metal component.

A particularly reliable type of screw connection between plastic component and metal component can be achieved when at least one of the bores extends at a slant toward another bore.

In an advantageous embodiment, one bore can be oriented vertically relative to the joining surface of the component while the other bore is extending at a slant toward the first bore.

In another embodiment, relative to the joining surface of the component, two bores that are positioned at a slant opposite each other or adjacent to each other can extend toward each other. Advantageously, two rows of screws can be arranged opposite each other, respectively.

According to a beneficial embodiment, an external thread of the screw can have a length that is at most as long as an inner free length of the bushing. In this way, it is possible that the screw with its external thread and optionally its pilot tip can be immersed completely in the bushing so that the screw no longer projects past bushing and thus past the joining surface of the plastic component. In this way, the screw, even with pilot tip, can be immersed with the external thread completely in the interior of the bushing in the not yet screw-connected state. In this way, the plastic component can be positioned in a simple way on the metal component.

According to further aspect of the invention, a plastic component, in particular a suction module for an internal combustion engine, is proposed for screw-connecting with a metal component, in particular a cylinder head of the internal combustion engine, comprising at least one screw comprising an external thread, arranged on a screw shank, and guided captively in a bushing. The bushing extends at least with a section thereof in a bore of the plastic component which extends at an angle relative to a vertical line on a joining surface which, in the screw-connected state, adjoins a further joining surface. The bushing is configured to be moveable out of the plastic component when screwing the screw into the metal component.

The plastic component according to the invention can be connected in a simple way with a metal component, for example, a plastic suction module with a metal cylinder head of an internal combustion engine, and comprises the advantage that the screw connection system can be easily released in a service situation. Due to the two-part screw connection system with a thin shank screw and a bushing with inner thread as a captive securing means, the suction module can be mounted and demounted without auxiliary tools. According to the invention, a reliable slanted screw connection by means of standard elements is proposed without an additional clamping strip. Further advantages are a reduced number of components as well as better tolerance behavior in comparison to screw connection systems according to the prior art.

According to a further aspect of the invention, a use of a screw connection system for producing a screw connection of a plastic component with a metal component is proposed, in particular of a suction module with a cylinder head of an internal combustion engine, wherein the suction module comprises a fluid connection to the cylinder head.

The screw connection system according to the invention serves advantageously for connecting a plastic component with a metal component, for example, a plastic suction module with a metal cylinder head of an internal combustion engine. The screw connection system comprises the advantage that the screw connection system can be easily released in a service situation. Due to the two-part screw connection system with a thin shank screw and a bushing with an inner thread as a captive securing means, the suction module can be mounted and demounted without auxiliary tools. According to the invention, a reliable slanted screw connection by means of standard elements is proposed without an additional clamping strip. Further advantages are a reduced number of components as well as a better tolerance behavior in comparison to screw connection systems according to the prior art.

According to a further aspect of the invention, an internal combustion engine with a suction module and a cylinder head is proposed, wherein the suction module is connected by means of a screw connection system with the cylinder head. With the proposed screw connection system, by means of a reliable slanted screw connection by means of standard elements without an additional clamping strip, a reliable connection of the suction module with the cylinder head can be provided. Also, it is possible to employ a reduced number of components and to ensure a better tolerance behavior.

BRIEF DESCRIPTION OF THE DRAWINGS

Further advantages result from the following drawing description. In the drawings, embodiments of the invention are illustrated. The drawings, the description, and the claims contain numerous features in combination. A person of skill in the art will consider the features expediently also individually and combine them to expedient further combinations.

DESCRIPTION OF PREFERRED EMBODIMENTS

Figure 1:
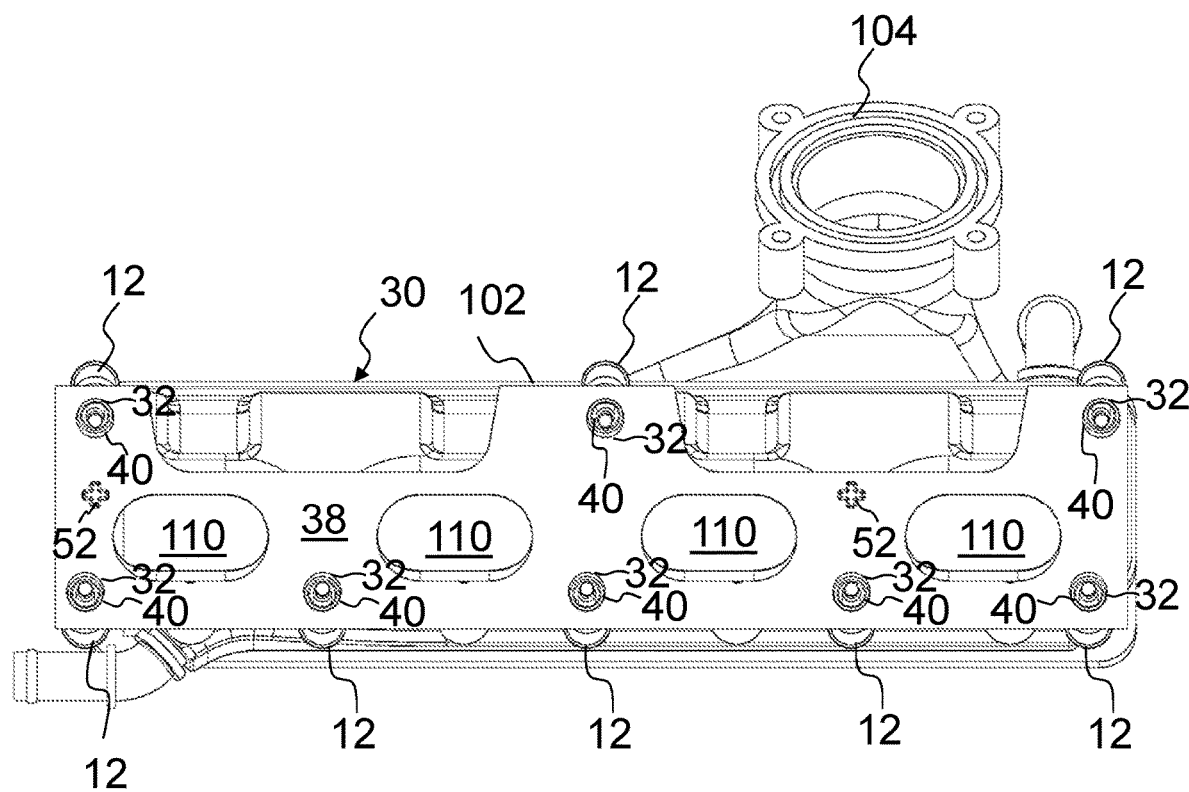
FIG. 1 shows an isometric illustration of a suction module according to an embodiment of the invention with a view of a joining surface.

In the Figures, the same or same-type components are provided with same reference characters. The Figures show only examples and are not to be understood as limiting.

Figure 2:
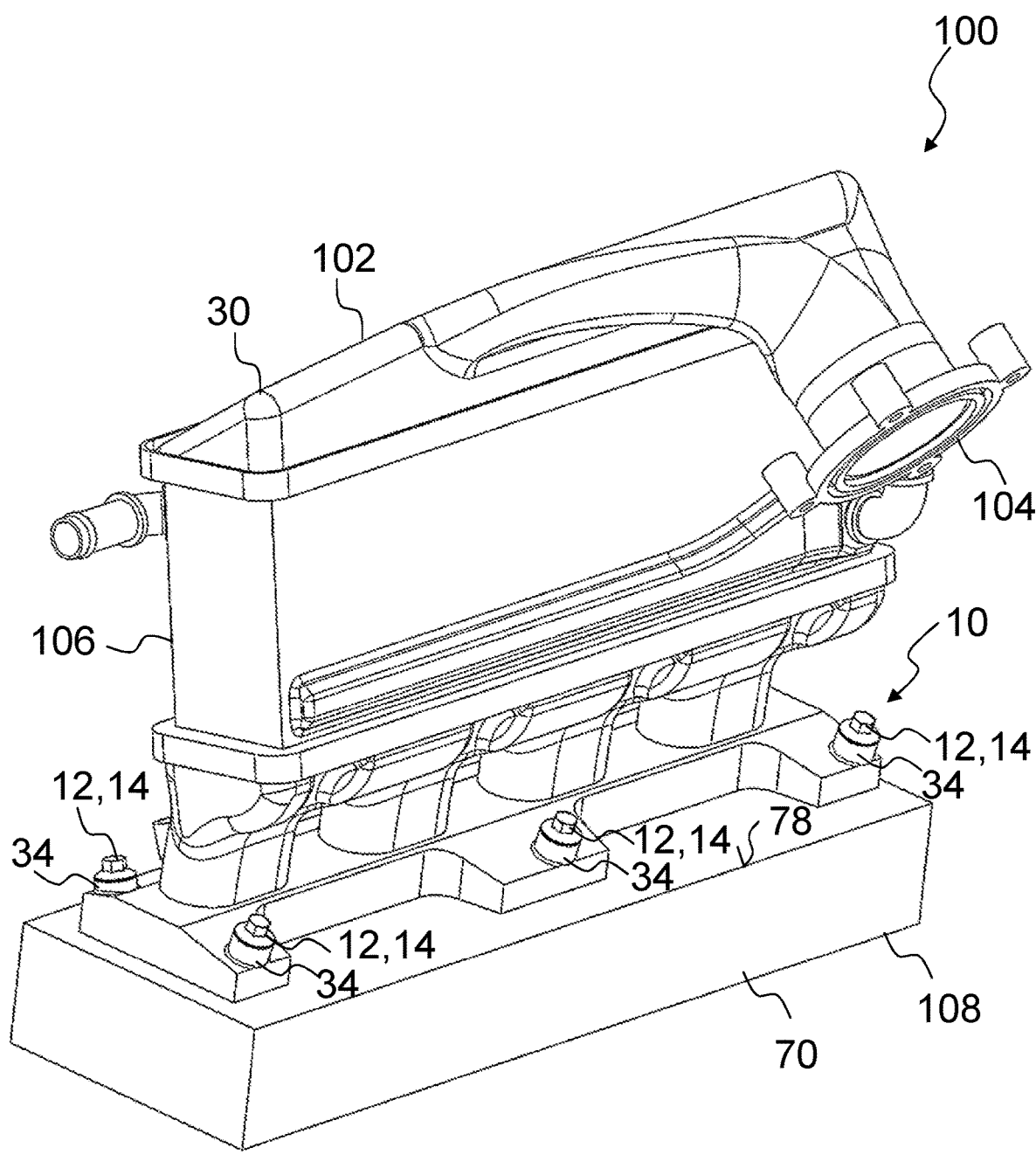
FIG. 2 shows a schematic illustration of an internal combustion engine with a suction module mounted on a cylinder head in isometric view.
Figure 3:
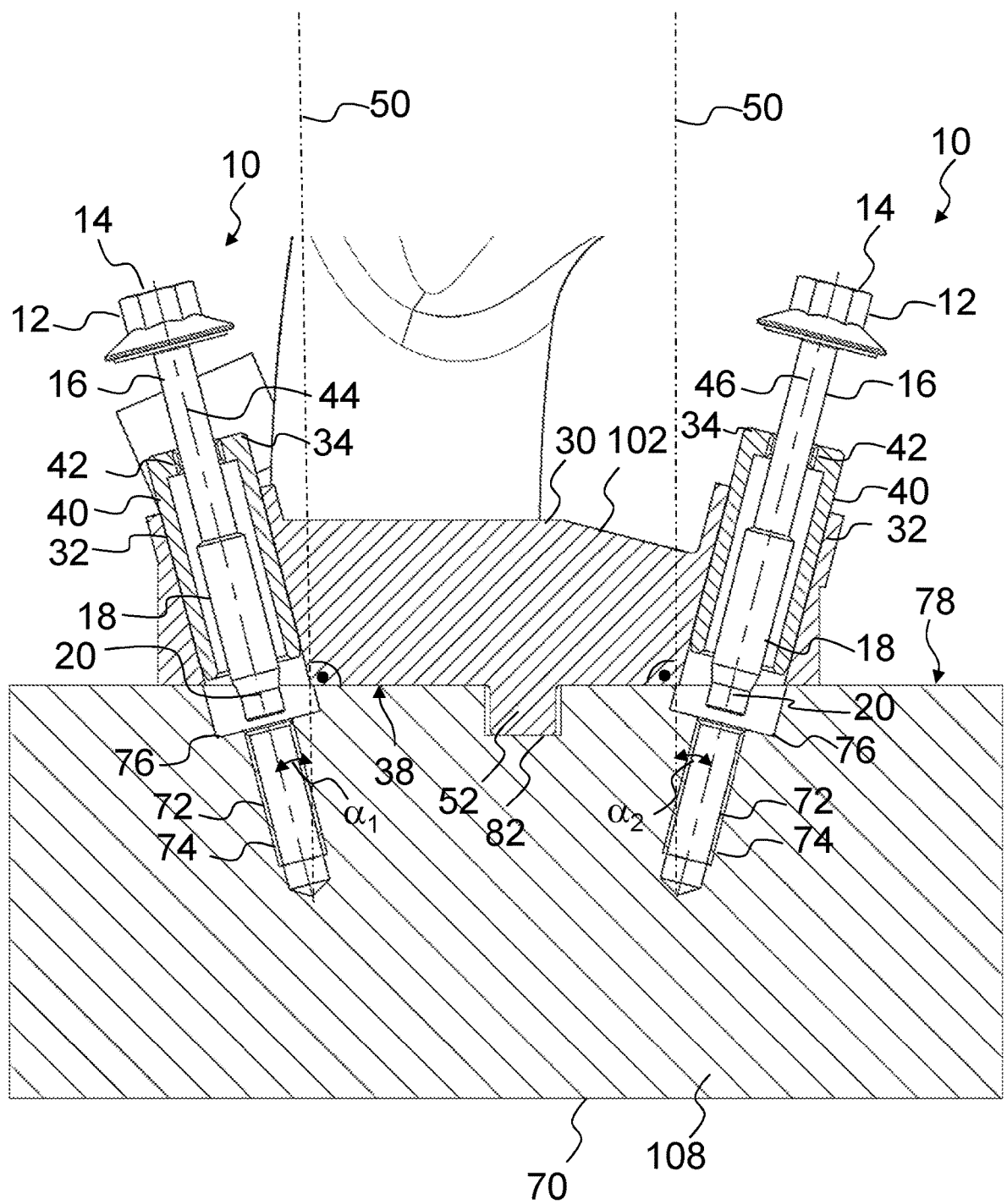
FIG. 3 shows a section of a screw connection system of the internal combustion engine transverse to the joining surfaces of suction module and cylinder head according to an embodiment of the invention in a delivery position.

FIG. 1 shows an isometric illustration of a suction module 102 according to an embodiment of the invention with view of a joining surface 38 of the suction module 102. FIG. 2 shows a schematic illustration of an internal combustion engine 100 with a suction module 102 mounted on a cylinder head 108 in isometric view. The suction module 102 is connected by means of a screw connection system 10 according to one embodiment of the invention with the cylinder head 108. In FIG. 3, a section of the screw connection system 10 of the internal combustion engine 100 transverse to the joining surfaces 38, 78 of suction module 102 and cylinder head 108 in a so-called delivery position is illustrated. The suction module 102 can be delivered in this position, for example. The screws 12 in this context do not project past the joining surface 38 of the suction module 102.

The plastic component 30, in the illustrated embodiment a suction module 102 for an internal combustion engine 100, is provided for screw-connecting to a metal component 70, in particular a cylinder head 108 of the internal combustion engine 100. The suction module 102 comprises a plurality of screws 12 comprising an external thread 18 arranged on a screw shank 16 and guided captively in bushings 40. The bushings 40 extend at least with a section thereof in bores 32 of the suction module 102 which are extending at an angle $\alpha 1$, $\alpha 2$ relative to a vertical line 50 on a joining surface 38 of the suction module 102 which, in the screw-connected state, adjoin a further joining surface 78 of the cylinder head 108. The bushings 40 are designed to be movable out of the suction module 102 when screwing the screws 12 into the cylinder head 108.

The suction module 102 in FIG. 1 comprises eight screws 12 which are captively guided in bushings 40 and inserted into bores 32 of the suction module 102. Six bores 32 are arranged in the suction module 102 such that two bores 32, respectively, are positioned opposite each other while two further bores 32 have no directly oppositely positioned partner.

In the embodiment illustrated in FIG. 1, all bores 32 are designed as slanted bores. Alternatively, it would also be possible to design only one row of bores 32 at a slant and to provide an oppositely positioned row with vertical bores 32. It would also be possible to provide only one row of bores 32 or only one bore 32 at a slant and to provide oppositely positioned thereto a pin, for example, a centering element 52 as a counter bearing.

Furthermore, outlets 110 can be seen in the joining surface 38 for the outflow of air out of the suction module 102 into the cylinder head 108. Entry of air into the suction module 102 is realized through intake opening 104.

In the joining surface 38, a centering device is also provided in order to position the suction module 102 on the cylinder head 108, wherein two centering elements 52 in the form of a cross rib are provided which, as illustrated in FIG. 3, engage a centering receptacle 82. The cross ribs 52 enable centering of the suction module 102 relative to the cylinder head 108 in longitudinal direction and transverse direction of the joining surfaces 38, 78. The suction module 102 is positioned with the cylinder head 108 by means of the centering elements 52 in the centering receptacle 82 wherein the bushings 40 are completely immersed in the plastic component 30. Possibly projecting screw segments of the screws 12 are pushed back practically without force into the bushings 40 when the suction module 102 is placed onto the cylinder head 108. The pilot tips 20 of the screws easily find the aligned bores 72 in the cylinder head 108 whereupon the screws 12 can be screwed into the threads 74 of the bores 72.

In FIG. 2, the suction module 102 is screw-connected by screws 12 with the (schematically illustrated) cylinder head 108 of the internal combustion engine 100. The screws 12 are screwed in so far that the screw heads 14 are contacting sockets 34 of the bores 32.

In FIG. 3, details of the screw connection system 10 according to an embodiment of the invention can be seen. The screw connection system 10 serves for producing the screw connection of the suction module 102 with the cylinder head 108 of the internal combustion engine 100 such that the suction module 102 can produce a fluid connection to the cylinder head 108.

In FIG. 3, the delivery position of the screw connection system 10 is illustrated in which the bushing 40, in the not yet screw-connected state, is provided immersed in the plastic component 30 relative to the joining surface 38 of the plastic component 30 such that the bushings 40 do not project past the joining surface 38 of the suction module 102. In the not yet screw-connected state, a segment of the screw 12 which is projecting at the joining surface 38 from the bushing 40 is loosely arranged in the bushing 40 such that the screw 12 in axial direction is substantially movable without force into the plastic component 30. The external thread 18 of the screw 12 has therefore beneficially a length which is at most as long as a free inner length of the bushing 40. In this way, the screw 12 can be easily pushed back so far that even the pilot tip 20 of the screw is retracted behind the joining surface 38 of the suction module 102.

The bushing 40 comprises at least in a section thereof an inner thread 42 which is arranged at the side of the bushing 40 facing away from the joining surface 38 of the plastic component 30. The inner thread 42 is provided for screwing in the external thread 18 of the screw 12 while the screw shank 16 of the screw, due to its reduced diameter, is freely slidable within the region of the inner thread 42.

The bore 72 in the cylinder head 108 is configured as a stepped bore with a step 76. Viewed from the joining surface 78 of the cylinder head 108 toward the step 76, the diameter of the bore 72 corresponds to the diameter of the bushing 40 so that the bushing 40 is movable within the bore 72. From this step 76 on, the diameter of the bore 72 corresponds to the diameter of the external thread 18 of the screw 12 and is provided with an inner thread 74 for screwing in the external thread 18.

In the section view in FIG. 3, two oppositely positioned bores 32, 72 in the suction module 102 and in the cylinder head 108 can be seen which extend at a slant toward each other. In this way, due to the screw connection system 10, a particularly reliable and safe connection of suction module 102 and cylinder head 108 can be achieved.

Figure 4:
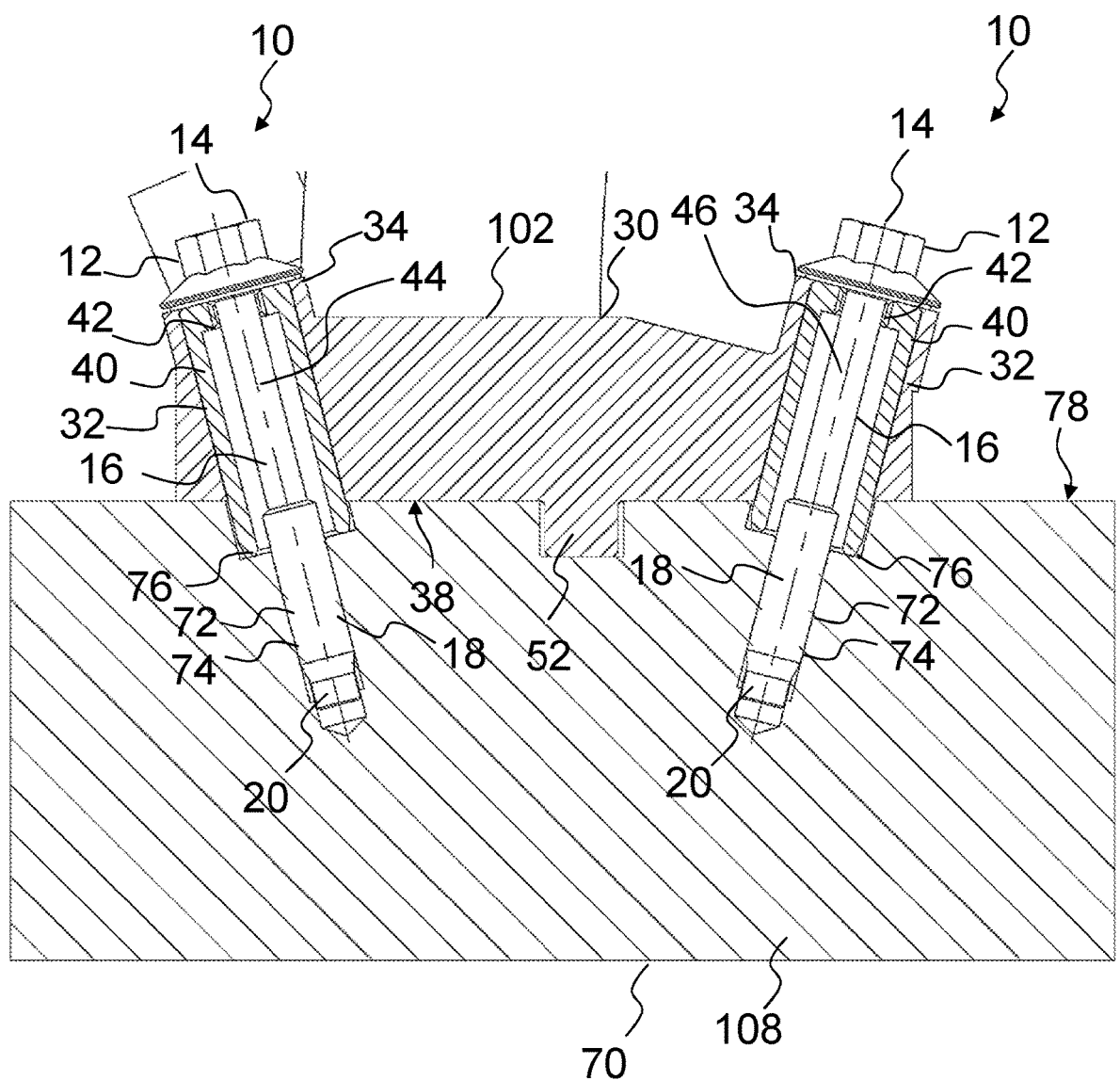
FIG. 4 shows a section of a screw connection system of the internal combustion engine according to an embodiment of the invention in an end position.

FIG. 4 shows a section through the screw connection system 10 of the internal combustion engine 100 according to an embodiment of the invention in the mounted end position which illustrates the suction module 102 in the screw-connected state with the cylinder head 108. In the end position, no movement of the screw 12 takes place anymore. For screw-connecting the suction module 102 with the cylinder head 108, the screw 12 is pushed into the bore 72 of the cylinder head 108 so far that the external thread 18 of the screw 12 engages the inner thread 74 of the bore 72. Then the screw 12 is turned farther whereby the bushing 40, as soon as the screw head 14 is seated on the bushing 40, is pushed into the bore 72 until the bushing 40 contacts the step of the bore 72. In the screw-connected state of the screw 12, the bushing 40 is therefore clamped between the step 76 of the bore 72 that is embodied as a stepped bore in the cylinder head 108 and the screw head 14 at the bore 32 of the plastic component 30. The screw head 14 is seated then on the socket 34 of the bore 32 in the suction module 102. In this way, suction module 102 and cylinder head 108 are fixedly and reliably screw-connected to each other.

Figure 5:
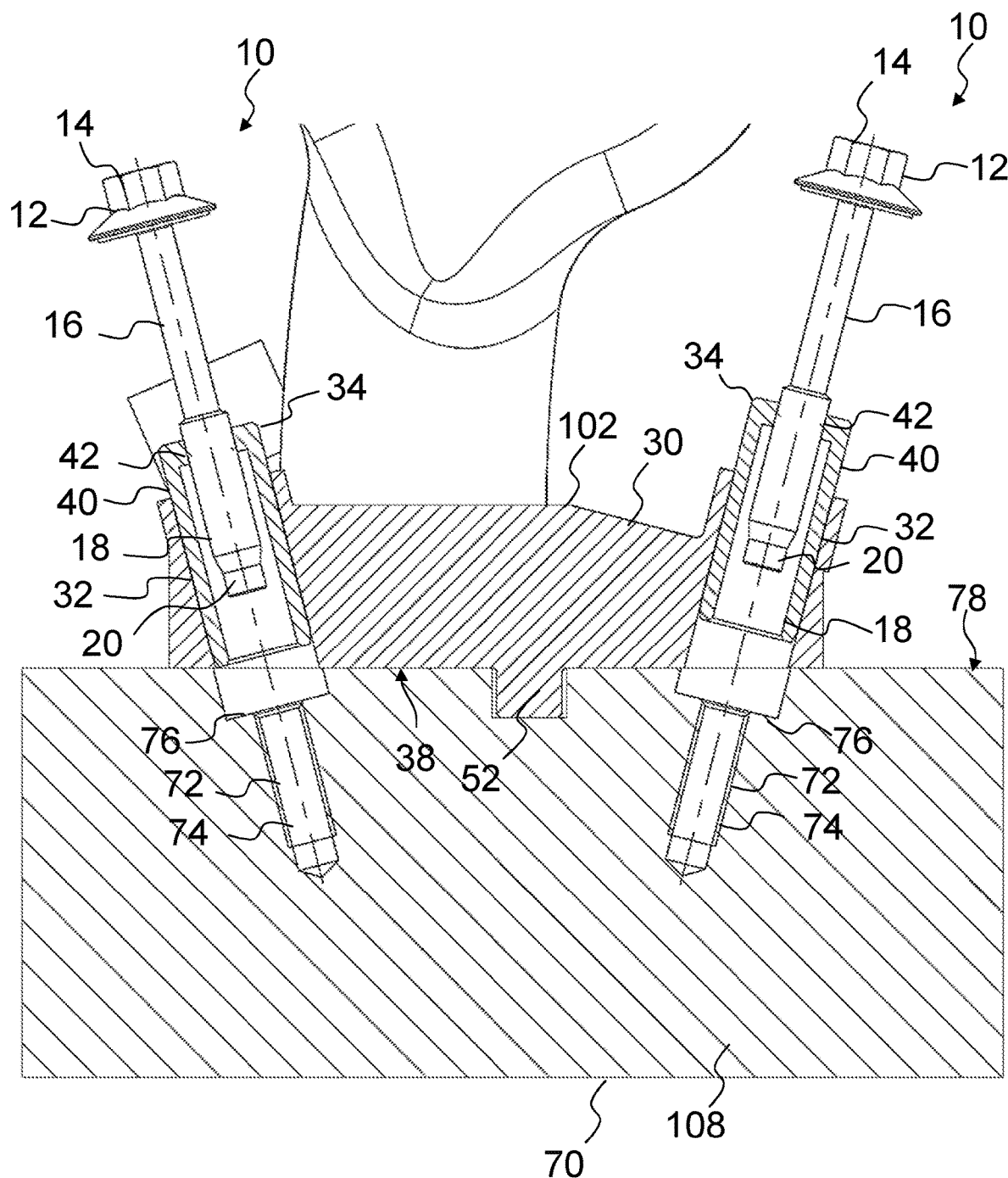
FIG. 5 shows a section of a screw connection system of the internal combustion engine according to an embodiment of the invention in a service position.

In FIG. 5, a section of the screw connection system 10 of the internal combustion engine 100 according to an embodiment of the invention in the so-called service position is illustrated. In this position, the screw connection is released to such an extent that the suction module 102 can be lifted off the cylinder head 108. For release of the screw connection between suction module 102 and cylinder head 108, the bushing 40 is embodied to be pulled out of the bore 72 of the cylinder head 108 in that the bushing 40 can be pulled out by means of the screw 12 which is screwed into the inner thread 42 of the bushing 40. The screw 12 is unscrewed from the inner thread 74 of the bore 72 of the cylinder head 108 until the screw 12 can move loosely within the bushing 40. Subsequently, the screw 12 is pulled out farther until the external thread 18 of the screw 12 engages the inner thread 42 of the bushing 40. The external thread 18 is screwed into the inner thread 42 provided with a few thread turns so that the bushing 40 by means of the screw 12 can be pulled out of the bore 72 of the cylinder head 108. This is done to such an extent that the bushing 40 is retracted behind the joining surface 38 of the suction module 102. In this way, the suction module 102 can be lifted off the cylinder head 108 in a simple way.

What is claimed is:

1. A screw connection system for connecting a plastic component with a metal component, the screw connection system comprising:
the plastic component having a bore having an internal diameter;
the metal component having an aligned bore, aligned with the bore of the plastic component;
a bushing having an upper axial end face, a lower axial end face, and a constant outer diameter from the upper axial end face, a lower axial end face, the outer diameter corresponding to the internal diameter of the bore of the plastic component in which the bushing is received, such that the bushing is completely received into an interior of the bore of the plastic component;
the bushing further having an inner thread arranged at the upper axial end face of the bushing;
a screw comprising a screw head, screw shank and an external thread arranged on the screw shank, the screw captively guided in the bushing;
wherein the bushing, in a screw-connected state of the screw connection system, extends with a first section thereof in a bore of the plastic component and with a second section thereof in an aligned bore of the metal component aligned with the bore of the plastic component,
wherein the bore of the plastic component and the aligned bore of the metal component are positioned at an angle relative to a vertical line on joining surfaces of the plastic component and of the metal component adjoining each other in the screw-connected state of the screw connection system;

wherein the bushing is configured to be movable out of the plastic component when screwing the screw into the metal component.

2. The screw connection system according to claim 1, wherein
the bushing, in a not yet screw-connected state of the screw connection system, is retracted into the plastic component relative to the joining surface of the plastic component.

3. The screw connection system according to claim 2, wherein,
in the not yet screw-connected state of the screw connection system, the screw is loosely arranged in the bushing and a segment of the screw projects at the joining surface of the plastic component from the bushing,
wherein the screw is configured to be insertable substantially without force into the plastic component in an axial direction of the bushing.

4. The screw connection system according to claim 1, comprising
a centering device configured to position the plastic component on the metal component.

5. The screw connection system according to claim 4, wherein
the centering device comprises a centering element and a centering receptacle,
wherein the centering element engages the centering receptacle.

6. The screw connection system according to claim 1, wherein
the the inner thread of the bushing is arranged at a side of the bushing facing away from the joining surface of the plastic component.

7. The screw connection system according to claim 1, wherein,
for releasing the screw-connected state of the screw connection system, the bushing is configured to be pulled out of the aligned bore of the metal component.

8. The screw connection system according to claim 7, wherein
the bushing is configured to be pulled out by the screw screwed into the inner thread of the bushing.

9. The screw connection system according to claim 1, wherein
the aligned bore of the metal component is a stepped bore having a first internal diameter sized to receive the lower axial end face of the bushing, the aligned bore of the metal component having a second diameter smaller than the diameter than the first internal diameter forming a step surface inside of the aligned bore at a transition between the first diameter and the second diameter in the metal component, the step surface forming an axial stop contacting against the lower axial end face of the bushing, when in the screw-connected state of the screw connection system.

10. The screw connection system according to claim 9, wherein
the bushing, in the screw-connected state of the screw connection system, is clamped between the step surface of the stepped bore and the screw head of the screw, the screw head contacting against an axial end of the bore of the plastic component.

11. The screw connection system according to claim 1, wherein
two or more of said bore of the plastic component are provided and at least two of said bores of the plastic component are oppositely arranged relative to each other and extend toward each other, and
wherein two or more of said aligned bore of the metal component are provided and at least two of said bores of the metal component are oppositely arranged relative to each other and extend toward each other.

12. The screw connection system according to claim 1, wherein
the external thread of the screw has a length that is at most as long as an inner free length of the bushing.

13. The screw connection system according to claim 1, wherein
the plastic component is a suction module and the metal component is cylinder head of an internal combustion engine.

14. The screw connection system according to claim 1, wherein
the plastic component is a suction module for an internal combustion engine, the suction module comprising:
a joining surface,
wherein the joining surface, in a screw-connected state of the plastic component, abuts against a joining surface of the metal component;
wherein the bore of the plastic component extending at an oblique angle relative to a vertical line on the joining surface of the suction module;
wherein the bushing is arranged in the bore of the plastic component;
wherein the screw is guided captively in the bushing;
wherein the lower axial end face of the bushing is movable out of the bore of the plastic component and into the stepped bore of the metal component by the screw head contacting the upper axial end of the bushing and urging the bushing into the stepped bore when screwing the screw into the metal component.

15. The screw connection system according to claim 14, further comprising:
wherein the metal component is a cylinder head of an internal combustion engine;
wherein the suction module is connected by the screw connection system with the cylinder head.

16. The screw connection system according to claim 15, wherein the suction module comprises a fluid connection to the cylinder head.

17. A method for connecting a plastic component to a metal component, the method comprising the step of
using a screw connection system according to claim 1 for producing a screw connection of the plastic component with the metal component.

18. A method for connecting a suction module to a cylinder head of an internal combustion engine, the method comprising the step of
using a screw connection system according to claim 1 for producing a screw connection of the suction head with the cylinder head,
wherein the suction module comprises a fluid connection to the cylinder head.

* * * * *